Patented Oct. 31, 1922.

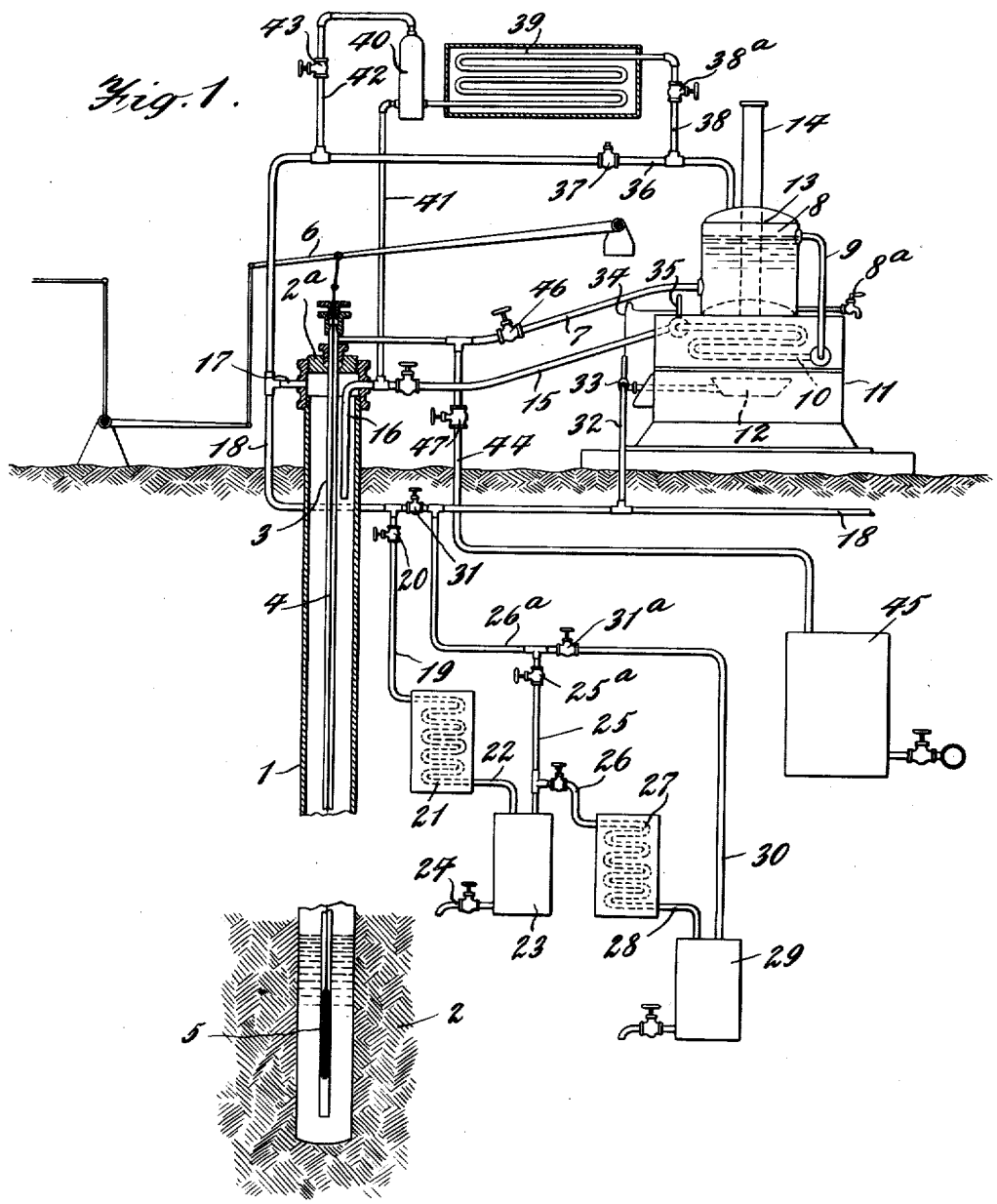

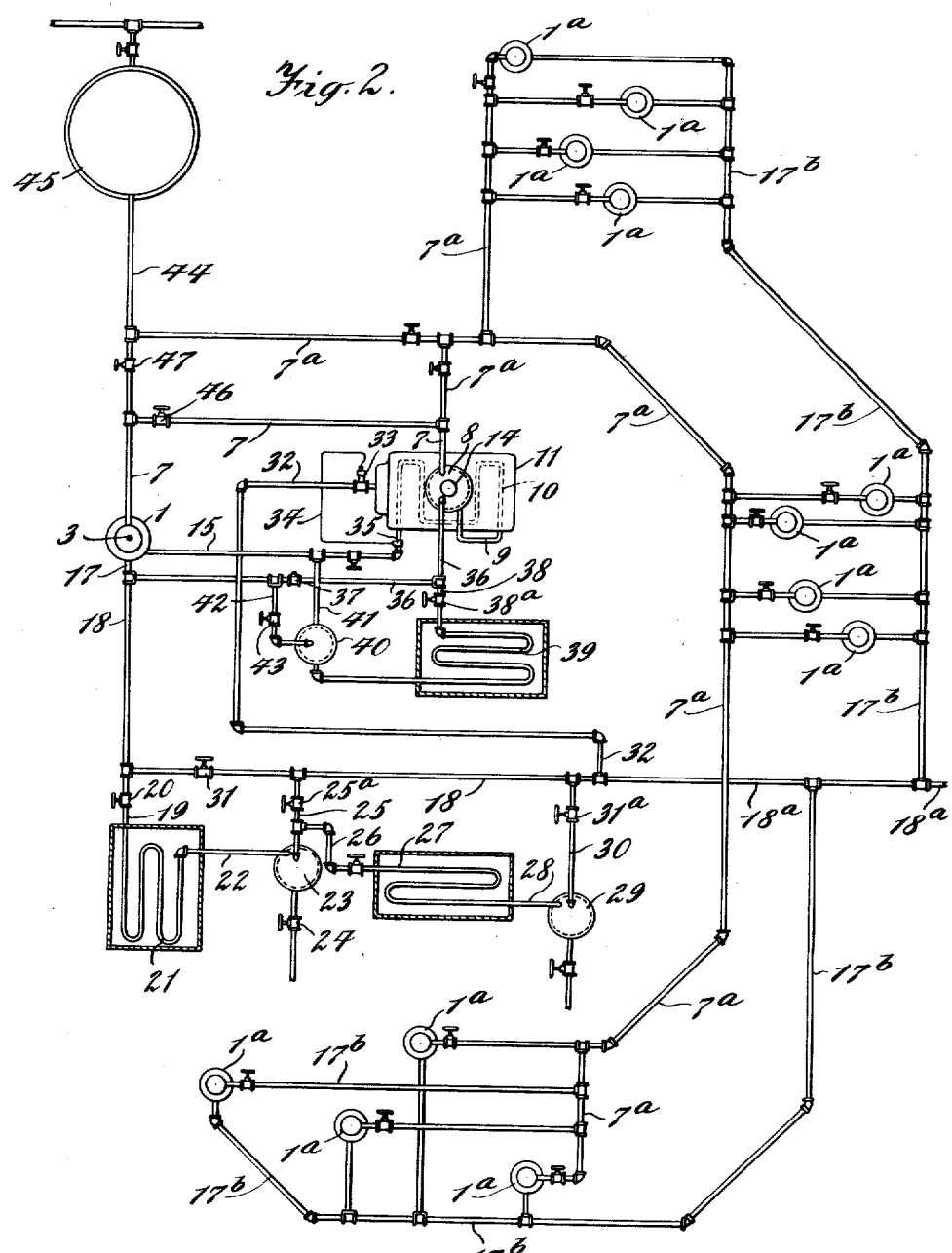

1,433,956

UNITED STATES PATENT OFFICE.

WILLIAM JOHN KNOX, OF NEW YORK, N. Y., ASSIGNOR TO ERSKINE D. WARREN, OF NEW YORK, N. Y.

PROCESS FOR THE RECOVERY AND REFINING OF LIGHT HYDROCARBON OILS AND GASES FROM OIL WELLS.

Application filed May 15, 1919. Serial No. 297,214.

*To all whom it may concern:*

Be it known that I, WILLIAM JOHN KNOX, a citizen of the United States, and a resident of New York city, borough of Manhattan, in the county and State of New York, have invented certain new and useful Improvements in Processes for the Recovery and Refining of Light Hydrocarbon Oils and Gases from Oil Wells; and I do declare the following to be a full, clear, and exact description of the invention, such as will enable others skilled in the art to which it appertains to make and use the same.

My invention relates broadly and generally to the recovery of hydrocarbons, and one of the objects, among others, is to recover naphthas, gasolines and the lighter hydrocarbon fractions of petroleum oils in a more efficient, more economical manner, and in larger quantities or percentages than is otherwise possible.

One of the greatest losses in oil well operations is due to the "weathering" of the oil. The oil as it exists in the sand or oil-bearing strata is under pressure, and because of this pressure, contains large quantities of absorbed gases and light volatile hydrocarbon vapors in the liquid form. A portion of these light compounds escape from the oil as it emerges from the strata into the well, and passes out of the well by means of the casing-head through pipe connections. However, naphtha, gasoline and fractions of vapor lighter than gasoline remain in the oil and are pumped with the oil to local storage tanks. These storage tanks are usually and necessarily open to the atmosphere, and no provision is made for conserving the volatile constituents. If the wells are comparatively small producers the oil remains in these open tanks for some time before it is turned into the collecting pipe lines, and in the summer time and in warm climates is exposed to a high temperature. The oil is then pumped for long distances through pipe lines to "tank farms" where it is stored under the same conditions, open to the atmosphere. The oil, finally, after months in storage reaches the refiner after it has lost the larger part of its most valuable constituents. My process has for one of its objects to prevent this loss and conserve these valuable constituents.

The process in the preferred embodiment comprehends the heating of the oil in the well, utilizing the bore of the well itself as a still and fractionation column, condensing means for separation of the light oils of any desired gravity or gravities from the hot gaseous and vapor product or portion, and the pumping of the residue oil, deprived of its light constituents, by means of the oil well pump, either co-incidentally or intermittently with the distillation, and preferably utilizing the oil well pump and the well itself as necessary and integral parts of the apparatus, although it will be understood that my invention is not limited to the use of the oil well pump for performing the pumping function hereinafter described.

It is a well known fact that the perfect fractionation of a petroleum oil or product is difficult by present commercial methods, and it is only in the laboratory that such a result can be approximated. It can be done by extensive fractionation and dephlegmation means and slow and careful distillation, but such extreme care is not economical. The value of the product, however, for example, gasoline or motor spirits, is largely dependent on its careful fractionation and freedom from heavy constituents. A perfect fractionation column should be maintained uniformly at a temperature slightly higher than the boiling point of the desired product. This, according to my invention, is attained by utilizing the bore of the well for a fractionation column because there can be no radiation changes in temperature, as the rock so insulates the well that any temperature imparted to it will remain practically constant. This condition attained, it is then desirable to secure for the vapors as long a distance of vertical travel as possible, so that the heavier constituents of the oil vapor of a boiling point higher than the desired fraction may have ample time and space in which to settle out of the ascending stream and not be carried over with it. On account of the cost, a column so perfectly protected from changes of temperature and with dimensions so ample for the settling out of the heavy condensates would be impossible if built of the ordinary materials and elements of construction.

In another application for Letters Patent, filed by me on or about April 10th, 1919, and serially numbered 288,926, is shown a heating device external to the well itself for heating the fluid contents of the well in cyclic connection with the oil well pump and the oil well. The present application contemplates the use of a similar device in similar cyclic connection with the pump and well whereby the oil in the well and the well itself may be heated to the required desired temperature and maintained at a uniform temperature.

My method of distilling off the lighter hydrocarbons, such as gasoline, namely by pumping the oil from the well, then in heating it by passing it through an external heating device, and subsequently returning it to the well, accomplishes a most complete and efficient evaporation and separation of all the lighter constituents, on account of the exposure of large and extended surfaces of the hot oil to evaporation conditions. It is a well known fact that the rate of evaporation of a liquid is directly proportional to the area of the surface of the liquid exposed to the atmosphere, and in my process the oil in falling down the bore of the well is spread out in thin films over the surfaces of the casing and of the wall, so that every portion of the oil is brought into atmospheric contact before it reaches the bottom of the well. Under these conditions a high temperature for evaporation is not essential, as the evaporation will take place even below the boiling point.

In my present invention the gases and fractional vapors from the well pass out of the well by a pipe connection from the casing-head and thence to a condensing means. This condensing device may consist of one condenser, or more depending upon the number of products or fractions it is desired to produce. If it is desired to separate out only standard "straight-run" gasoline then one condenser in which the temperature is maintained at the end temperature or thereabouts of the desired fraction and of ample capacity is used, and the lighter vapors and the gas are piped off and sold or may be treated in a casing-head gasoline plant for the recovery of the hydrocarbon oils lighter in gravity than the standard gasoline fraction. If it is desired to separate out fractions such as naphtha, higher in gravity and boiling point than gasoline, and a product lighter than gasoline, together with gasoline, then more condensing units are used as shown. In such case the condenser units will be maintained in a descending scale of temperatures, according to the fractions desired.

The necessary tanks or accumulators for collecting the distillates or distillate as shown act as traps for the separation of the gases, which may be conducted to a fuel gas distributing line, or to a casing-head gasoline plant.

In the accompanying drawings, to be taken as part of this specification, I have shown one form of apparatus of my invention, and which is well adapted to carry out the process constituting my present invention.

In said drawings:—

Figure 1 is a view in side elevation, partly in section, of the apparatus, the same being shown as being applied to a single oil well.

Fig. 2 is a diagrammatic plan view of an apparatus for carrying out my invention in connection with a number of oil wells in a field.

Referring to the drawings by characters of reference, I will describe the apparatus shown, and will set forth the process of my invention in connection with the description of the operation of said apparatus.

I have described my invention with regard to the use of a heating device external to the well of the construction shown in my said application, but I do not confine myself to such external means.

2 designates the earth stratum, or so-called oil sand, into which the casing is driven or lowered. The well casing may be provided with the usual casing-head 2$^a$ supporting a pump tubing 3 in which is arranged a pump rod 4 for operating a pump piston 5, all of which may be of any well known or suitable construction. The pump rod 4 projects through the casing-head and is connected to any suitable lever mechanism 6, by means of which the pump is operated or reciprocated to elevate the oil from the well. The pump casing is connected by an outlet pipe 7 to a receiving chamber 8 into which the oil is pumped by means of the pump mechanism heretofore described. The receiving chamber 8 opens at its upper portion into an outlet pipe 9 through which the oil flows into a heating coil 10 arranged in the casing of a heater 11 provided with a suitable burner 12. The receptacle or chamber 8 is preferably provided with a central flue 13 leading to a stack 14 through which flue the products of combustion pass from the burner 12, in order to initially heat the body of oil contained in the chamber 8. The heat applied to the oil in the chamber 8 reduces its viscosity and separates out the water and sludge from the oil, and also volatilizes some of the lighter constituents.

The initially heated oil flows from the chamber 8 through the pipe 9 into the heating coil 10, where it is further heated to such a degree that when discharged into the oil well casing, as will be hereinafter described, the heat will be sufficient to volatilize the hydrocarbons therein and in the well, in order to produce lighter hydrocarbons therefrom. The heated oil then passes by means of a connecting pipe 15 to the interior of the well casing 1, the said pipe 15 being projected through the casing-head 2ª into the casing, as at 16, for the purpose stated. The oil elevated by the pump piston passes through the pipe 7, and is heated by the heating element comprising preferably the chamber 8 and the coil 10, in order to volatilize a portion of the lighter products therefrom, and to separate out the water and sludge, as stated, whereupon said heated oil is flowed into the casing to impart to and maintain sufficient temperature in the well and in the oil bearing stratum to volatilize lighter products therefrom.

Connected to the casing-head 2ª is a pipe section 17 which opens into a pipe 18 by means of which casing-head gas and light volatized products produced in the well may be transmitted to any suitable accumulator or to means for treating said gas, for example, to an apparatus for recovering condensable constituents from said gas. For the purpose last stated, the pipe 18 may be connected by a pipe 19 containing a valve 20 to a suitable condenser coil, or other condensing apparatus 21, the oulet 22 of which opens into an accumulator chamber 23 from which condensed products may be withdrawn through a valve outlet 24. Leading from the chamber 23 is an outlet pipe 25 which may be connected by a branch 26 with a condenser unit 27, having an outlet 28 leading to an accumulator chamber 29 to receive condensed products condensed in said unit 27. The pipe 25 may be connected to a pipe 26ª, to which is also connected a pipe 30 leading from the said chamber 29 so that uncondensed vapor and residue gases in the chambers 23 and 29 may pass by means of said pipe 26ª to the pipe 18, heretofore referred to, through which said uncondensed gases may pass to a point of storage or consumption or treatment. I preferably provide the pipe 18 at a point between the pipes 20 and 26ª with a valve 31, in order to control the flow of gas through the condensers and to divert the uncondensed gas into the pipe 18. If it is desired that all of the gas flowing from the well casing be diverted from the condensers, it is only necessary to close the valve 20 and open the valve 31. When it is desired to subject the gas flowing from the well casing to condensation, the valve 20 is opened, and the valve 31 closed. If desired, the pipe 25 may be provided with a valve 25ª, and the pipe 30 with a valve 31ª, in order to further control and divert the gas and vapor.

Gases or liquid fuel may be supplied to the burner 12 in any suitable manner, but I prefer to connect said burner by a feed pipe 32 with the gas line 18, the flow of gas through said pipe 32 being controlled by a thermostatic valve 33 connected by a conductor 34 with a thermostatic device 35 subjected to the temperature of the oil flowing from the coil 10, the arrangement being such that said valve 33 is controlled to regulate the amount of fuel fed to the burner 12 in order to maintain the oil passing from the heating device through the pipe 15 at a predetermined maximum temperature irrespective of the amount of oil flowing through said heating device.

The upper portion of the heating chamber 8 may be connected by a vapor pipe 36 containing a controlling valve 37, to the said pipe 18, so that the vapors given off the oil in said chamber may, if desired, be passed through the pipe 18 to the condensing apparatus 21 and 27, or diverted through the pipe 18 to the point of storage or consumption. If desired, the vapors passed off from the heater 8 may be subjected to a preliminary separation treatment before any portion thereof is delivered to the pipe 18, and for this purpose the pipe 36 may be connected with a pipe 38 leading to a condenser unit 39, the outlet of which opens into a separator or trap 40 provided with an outlet pipe 41 for condensed products, which are delivered by said pipe to the pipe 16, so that the products condensed in the unit 39 are permitted to commingle with the oil in the pipe 16 and be delivered to the well casing for fractionation therein. The separator or trap 40 is preferably connected by a valved outlet pipe 42, the valve being shown at 43, to the pipe 36, heretofore described, so that the uncondensed gases resulting from the separation treatment in the condenser 39 may enter the pipe 36 and be delivered thereby to the pipe 18. By closing the valve 37 and opening the valve 38ª in the pipe 38, and the valve 43 in the pipe 42, all of the volatilized products flowing from the chamber 8 will be diverted through the condenser unit 39, as heretofore described. On the other hand, by closing the valve 38ª and the valve 43, and opening the valve 37, all of the volatilized products pass directly to the pipe 18.

The pipe 7 is provided with a controlling valve 46 between the heater and the said pipe 44, and the pipe 44 is provided with a valve 47. By positioning the valves 46 and 47, the entire body of oil pumped from the well casing may be caused to pass through the heating device and be heated therein for the purpose heretofore described, or a portion of the oil pumped from the well may be diverted through the pipe 44 into the storage tank or collector 45, or the entire body of oil pumped from the well may be delivered to said storage tank or collector 45.

I will now describe the operation of the said process referring to the apparatus as above described: Oil pumped from the well passes through the pipe 7 to the heater, where it may be heated to such a temperature as to separate out the water and sludge, which may be withdrawn through the drain 8ª at the base of the chamber, and to raise the temperature of the oil to such a point as to drive off a portion of the volatile constitutents and impart to the oil such temperature that, when it is flowed back into the well, the oil stratum and oil in the well will be heated to such a temperature that volatile constituents of the oil in the well will be driven off. The temperature may be varied according to the product it is desired to recover. If the product desired be gasoline, the oil admitted to the well will be heated to such a temperature as to maintain the well and its contents preferably at a temperature at or above the end boiling point of gasoline, which end boiling point, as is well known, varies according to the commercial use to which the gasoline is to be put. It is well known that gasoline begins to distill off at or below 150° F. and that the end boiling point may be as high as 350° F. Of course, the temperature may be well above the end boiling point of the product to be recovered, producing vapors containing vapor of the desired product, which product may be separated and recovered by any well known means, such as the described fractionation column of the well and the condensing means. The oil from the chamber 8 passes through the heating coil 10 and through the pipe 15 into the well casing, through the delivery pipe 16, and in its heated condition this oil heats the interior of the well, and its contents, to a temperature sufficient to volatilize and separate by fractionation the desired light products. The evaporation or volatilization is produced not only by imparting heat to the oil in the well, but also by the breaking up of the oil into fine films and spray, by virtue of which the surface of the oil is immensely extended. The volatile constituents, together with the gas, rise through the well casing and pass out through the pipes 17 and 18 through which they may be lead to the condenser units 21 and 27, in order to condense out the desired products, or may be diverted through the pipe 18 and lead to a suitable source of consumption, storage or treatment.

In the heating device 11 a certain amount of the light condensable constituents, such as the gasoline portion, are volatilized; the larger part of these are carried by the moving stream of hot oil into the casing-head of the well, and are there fractionated and freed from the heavier "ends," but a portion of the vapors are liberated above the oil in the receiving drum 8 of the heating device. This portion of the vapors contains entrained heavy oil vapors which would vitiate the quality of the gasoline if allowed to remain in it. In order to free the vapors, thus arising, from there heavy "ends" a condenser 39 and trap 40 are interposed between the receiving drum 8 of the heating device and the well, and the vapors and gases from the drum pass out therethrough by means of valved pipes 36 and 38, the condensable portions being thrown down and the light gases being trapped out to the residue gas line 18, by pipe 42 connected into pipe 18. The crude gasoline condensate pases by pipe connection 41 and pipe 15 to the casing-head of the well and is fractionated therein and refined together with the vapors arising from the well, so as to produce a completely refined product, as described above.

The oil well acts as a fractionation column to perform the efficient separation of desired volatile products from the oil in the well, for the reasons heretofore stated. The heat supplied to the fractionation column, i. e., the well and its casing, by the heated oil, need only be high enough or sufficient to produce the working temperature at which the desired product will be driven off from the oil in its extended state. There is a notable efficiency and economy of heat in the operation of my process, due to the fact that the well shaft and casing are efficiently insulated, and heat losses are therefore reduced to a minimum, and the temperature of fractionation is uniformly maintained.

In Figure 2 of the drawings I have shown the invention applied to a number of wells in a field, and in which the reference numeral 1 indicates the well employed as the fractionation column, and the reference numerals 1ª indicate respectively the wells in a field from which oil and gas are drawn for treatment in accordance with my invention. Each of the wells is connected by an oil line 7ª with the pipe 7 emptying into the heater 8, and also with a gas line 17ᵇ connected to a pipe 18ª corresponding to the pipe 18, heretofore described, which is connected by branch lines to the chambers 23 and 29, heretofore described, so as to receive the uncondensed gas from said chambers. In the arrangement shown in Fig. 2, I merely desire to show the application of the invention to a number of oil wells, so that the oil supplied to the heater and to the fractionation well may be drawn from all or any part of a number of wells in a field. It will be understood that the various pipe lines 7ª will be provided with valves whereby any well or number of wells may be coupled into or cut out of the system.

What I claim and desire to secure by Letters Patent of the United States is:

1. A method of recovering hydrocarbons which consists in withdrawing liquid hydrocarbon from an oil well, subjecting the same to heat at a point external of the well, returning the heated hydrocarbon to the well at a temperature sufficient to volatilize a desired product from the contents of the well, withdrawing the volatilized product while in vapor form, and condensing a desired product therefrom.

2. A method of recovering hydrocarbons which consists in continuously withdrawing liquid hydrocarbon from an oil well, subjecting the same to heat at a point external of the well, returning the heated hydrocarbon liquid to the well while said liquid is at a temperature sufficient to volatilize a desired product from the contents of the well, withdrawing the volatilized product in vapor form, and condensing a desired product therefrom.

3. A method of recovering hydrocarbons which consists in continuously withdrawing liquid hydrocarbon from an oil well, subjecting the same to heat at a point external of the well to such a temperature as to partially volatilize the same, condensing the volatilized products produced by said heat treatment, returning the residue liquid hydrocarbon to the well while said liquid is at a temperature sufficient to volatilize a desired product from the contents of the well, withdrawing the volatilized products while in vapor form, and condensing a desired product therefrom.

4. A method of recovering hydrocarbons which consists in continuously withdrawing liquid hydrocarbon from an oil well, subjecting the same to heat at a point external of the well to partially volatilize the same, subjecting the volatilized products externally of the well to condensation to separate a liquid product therefrom, causing said condensed liquid product, together with residue of the heated oil to return to the well at a temperature sufficient to volatilize a desired product from the contents of the well, withdrawing the volatilized products while in vapor form from the well, commingling the same while in vapor form with the uncondensed volatilized hydrocarbon previously withdrawn from the well, and subjecting the commingled volatilized vapor products to condensation.

5. A method of recovering hydrocarbons which consists in continuously withdrawing liquid hydrocarbon from on oil well, heating the same at a point external to the well, returning the heated hydrocarbon liquor to the well to heat the latter sufficiently to volatilize a desired product from the contents of the well, simultaneously withdrawing the volatilized product in vapor form and casing-head gas from the well, and subjecting the same to condensation.

6. A method of recovering hydrocarbons which consists in continuously withdrawing liquid hydrocarbon from an oil well, subjecting the same to heat at a point external of the well, returning the heated hydrocarbon liquid to the well at a temperature sufficient to volatilize a desired product form the contents of the well, and in such manner as to expose a large extended surface of the said heated liquid hydrocarbon to evaporation conditions, withdrawing from the well, the volatilized product while in vapor form and subjecting the same to condensation externally of the well.

7. A method of recovering hydrocarbons which consists in withdrawing liquid hydrocarbon from a plurality of oil wells, subjecting the combined liquid hydrocarbon to heat, passing the same into an oil well at a temperature sufficient to volatilize a desired product from the contents of said well, and maintaining temperature within the well whereby the latter serves as a fractionation column, recovering the volatilized and fractionated product or products while in vapor form from said well, subjecting the same to condensation, and withdrawing the residue oil from said well.

8. A method of recovering hydrocarbons which consists in passing into an oil well hydrocarbon liquid heated at a point external of the well to such a temperature as to maintain a temperature within the oil well sufficient to volatilize a desired product from the contents of the well, continuously withdrawing and heating the unvolatilized portion of the liquid hydrocarbon from the well, and returning the same to the well so as to maintain said temperature within the oil well, and withdrawing the desired volatilized product in vapor form.

9. A method of recovering hydrocarbons which consists in continuously withdrawing liquid hydrocarbon from an oil well, passing the liquid hydrocarbon through a heater and returning it to the oil well, said liquid hydrocarbon being heated to such a temperature that the contents of the oil well will be heated to a temperature at or above the end boiling point of the product desired to be recovered and withdrawing the thus volatilized product from the well.

10. A method of recovering hydrocarbons which consists in utilizing an oil well as a fractionation column by heating the said well by admitting thereto oil heated to such a temperature as to heat the well and the oil therein so as to volatilize a desired product from the contents of the well, said heated oil being admitted to the column at a point adjacent the upper portion thereof, so that the rising vapors from the well are contacted within the well by an extended surface of the descending heated oil, and recovering the volatilized fractionated product or products.

11. A method of recovering lighter hydrocarbons from oil wells, which consists in passing the oil from a plurality of wells through a heating device external to the wells, flowing the heated oil into one of the wells while said oil is at a temperature sufficient to volatilize the lighter desired hydrocarbons from the oil and from the contents of the well, utilizing the heated well as a fractionation column by causing the ascending volatilized product to contact the descending heated oil, withdrawing the volatilized fractionated product and gas and separating the desired lighter hydrocarbon from the gas by condensation.

In testimony whereof I have hereunto signed my name in the presence of two subscribing witnesses

WILLIAM JOHN KNOX.

Witnesses.
ADELE S. EBERHARDT,
C. G. HEYLMUR.

Certificate of Correction.

It is hereby certified that in Letters Patent No. 1,433,956, granted October 31, 1922, upon the application of William John Knox, of New York, N. Y., for an improvement in "Processes for the Recovery and Refining of Light Hydrocarbon Oils and Gases from Oil Wells," errors appear in the printed specification requiring correction as follows: Page 2, line 34, for the word "fractional" read *fractionated;* page 3, line 17, for the word "volatized" read *volatilized;* page 4, line 77, for the misspelled word "pases" read *passes;* page 5, line 55, claim 5, for the word "liquor" read *liquid,* and line 69, claim 6, for the word "form" read *from;* and that the said Letters Patent should be read with these corrections therein that the same may conform to the record of the case in the Patent Office.

Signed and sealed this 26th day of December, A. D., 1922.

[SEAL.]
KARL FENNING,
*Acting Commissioner of Patents.*